United States Patent
Akuzawa et al.

(10) Patent No.: US 9,742,307 B2
(45) Date of Patent: Aug. 22, 2017

(54) RECTIFYING CIRCUIT FOR HIGH-FREQUENCY POWER SUPPLY

(71) Applicant: MITSUBISHI ELECTRIC ENGINEERING COMPANY, LIMITED, Chiyoda-ku (JP)

(72) Inventors: Yoshiyuki Akuzawa, Chiyoda-ku (JP); Kiyohide Sakai, Chiyoda-ku (JP); Toshihiro Ezoe, Chiyoda-ku (JP); Yuki Ito, Chiyoda-ku (JP)

(73) Assignee: Mitsubishi Electric Engineering Company, Limited, Chiyoda-ku (JP)

( * ) Notice: Subject to any disclaimer, the term of this patent is extended or adjusted under 35 U.S.C. 154(b) by 0 days.

(21) Appl. No.: 15/031,196

(22) PCT Filed: Dec. 26, 2013

(86) PCT No.: PCT/JP2013/084824
§ 371 (c)(1),
(2) Date: Apr. 21, 2016

(87) PCT Pub. No.: WO2015/097801
PCT Pub. Date: Jul. 2, 2015

(65) Prior Publication Data
US 2016/0248339 A1    Aug. 25, 2016

(51) Int. Cl.
*H02M 7/04* (2006.01)
*H02M 7/06* (2006.01)
(Continued)

(52) U.S. Cl.
CPC ............... *H02M 7/04* (2013.01); *H02M 1/14* (2013.01); *H02M 7/06* (2013.01); *H02M 7/217* (2013.01); *Y02B 70/1441* (2013.01)

(58) Field of Classification Search
CPC .. H02J 50/12; H02J 17/00; H02J 50/20; H02J 5/005; H02J 50/40; H02J 50/10;
(Continued)

(56) References Cited

U.S. PATENT DOCUMENTS

| | | | | |
|---|---|---|---|---|
| 5,991,167 A | * | 11/1999 | Van Lerberghe | H02J 7/022 363/127 |
| 8,278,784 B2 | * | 10/2012 | Cook | H01Q 1/2225 307/149 |
| 2011/0309689 A1 | | 12/2011 | Kamata | |

FOREIGN PATENT DOCUMENTS

| | | |
|---|---|---|
| JP | 2001-218468 A | 8/2001 |
| JP | 2008-125198 A | 5/2006 |

(Continued)

OTHER PUBLICATIONS

International Search Report issued Apr. 1, 2014, in PCT/JP2013/084824 filed Dec. 26, 2013.

*Primary Examiner* — Adolf Berhane
*Assistant Examiner* — Henry Lee, III
(74) *Attorney, Agent, or Firm* — Oblon, McClelland, Maier & Neustadt, L.L.P.

(57) ABSTRACT

Disclosed is a rectifying circuit for high-frequency power supply that rectifies an alternating voltage at a high frequency equal to or higher than 2 MHz, the rectifying circuit for high-frequency power supply including a current doubler rectifier circuit that rectifies the alternating voltage inputted from a reception antenna for power transmission 10, a partial resonant circuit that causes the current doubler rectifier circuit to perform partial resonant switching in a switching operation at the time of rectification, a matching functional circuit that has a function of matching a resonance condition to that of the reception antenna for power transmission 10, and a function of matching the resonance condition to that of the partial resonant circuit, and a smoothing functional (Continued)

circuit that smooths the voltage rectified by the current doubler rectifier circuit into a direct voltage.

9 Claims, 10 Drawing Sheets

(51) Int. Cl.
    *H02M 7/217*    (2006.01)
    *H02M 1/14*    (2006.01)

(58) Field of Classification Search
    CPC ....... H02J 50/50; H02J 7/025; Y02B 70/1441; H02M 2007/4815; H02M 7/06; H02M 7/217; H02M 1/14; H02M 2007/4818
    See application file for complete search history.

(56) References Cited

FOREIGN PATENT DOCUMENTS

| | | |
|---|---|---|
| JP | 2009-290950 A | 12/2009 |
| JP | 2010-130800 A | 6/2010 |
| JP | 2012-23949 A | 2/2012 |
| JP | 2012-135127 A | 7/2012 |

* cited by examiner

RECTIFYING CIRCUIT FOR HIGH-FREQUENCY POWER SUPPLY

FIELD OF THE INVENTION

The present invention relates to a rectifying circuit for high-frequency power supply that rectifies an alternating current power supply at a high frequency.

BACKGROUND OF THE INVENTION

A current doubler rectifier circuit according to a conventional technology is shown in FIG. 10. In this current doubler rectifier circuit, an inputted alternating voltage Vin having a frequency of around 30 kHz is rectified and is converted into a direct voltage, and the direct voltage is outputted (for example, refer to patent reference 1).

RELATED ART DOCUMENT

Patent Reference

Patent reference 1: Japanese Unexamined Patent Application Publication No. 2008-125198

SUMMARY OF THE INVENTION

Problems to be Solved by the Invention

A problem with the conventional configuration, is, however, that because the technique is premised on a frequency band of around 30 kHz, when the technique is applied to the rectification at a high frequency equal to or higher than a MHz band, the power conversion efficiency is not high. Particularly in a case in which a circuit, such as a resonant type reception antenna, which has high frequency characteristics in its output impedance is connected to an input side of the current doubler rectifier circuit, an influence is exerted upon the operation of the current doubler rectifier circuit itself, and an efficient power conversion operation which is an essential object cannot be maintained.

The power loss in the circuit which occurs at the time of the rectifying operation results in heat energy and hence a temperature rise of the circuit board. This results in an increase in the operating environment temperature of the circuit board and a reduction in the life of the used parts. Therefore, a measure, such as a measure of providing an exhaust heat device, is needed, and the conventional configuration also causes an increase in cost, upsizing, and an increase in mass.

The present invention is made in order to solve the above-mentioned problems, and it is therefore an object of the present invention to provide a rectifying circuit for high-frequency power supply that can provide a high power conversion efficiency characteristic in rectification of an alternating voltage at a high frequency equal to or higher than 2 MHz.

Means for Solving the Problem

According to the present invention, there is provided a rectifying circuit for high-frequency power supply that rectifies an alternating voltage at a high frequency equal to or higher than 2 MHz, the rectifying circuit for high-frequency power supply including: a current doubler rectifier circuit that rectifies the alternating voltage inputted from a reception antenna for power transmission; a partial resonant circuit that causes the current doubler rectifier circuit to perform partial resonant switching in a switching operation at the time of rectification; a matching functional circuit that has a function of matching a resonance condition to that of the reception antenna for power transmission, and a function of matching the resonance condition to that of the partial resonant circuit; and a smoothing functional circuit that smooths the voltage rectified by the current doubler rectifier circuit into a direct voltage.

Advantages of the Invention

Because the rectifying circuit for high-frequency power supply according to the present invention is configured as above, a high power conversion efficiency characteristic can be provided in the rectification of the alternating voltage at a high frequency equal to or higher than 2 MHz.

EMBODIMENTS OF THE INVENTION

Hereafter, the preferred embodiments of the present invention will be explained in detail with reference to the drawings.

Embodiment 1

Figure 1:
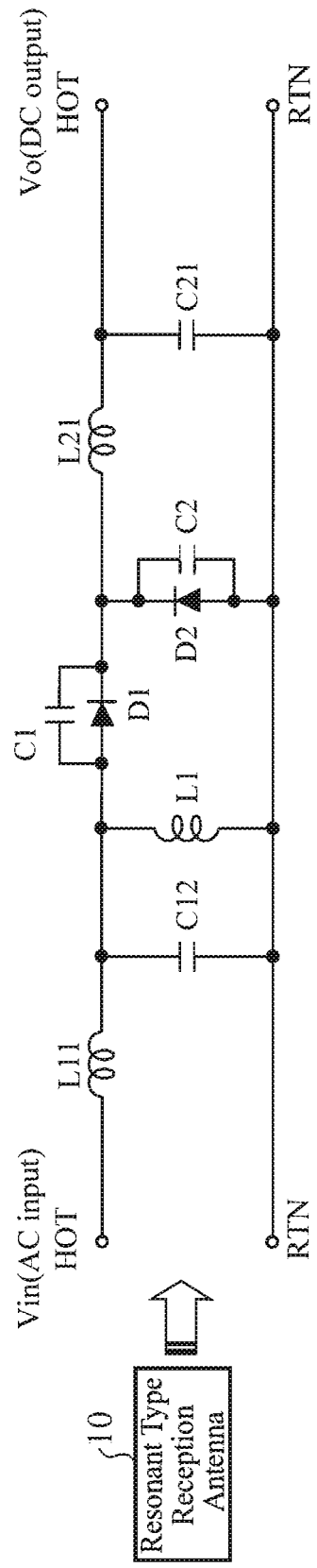
FIG. 1 is a diagram showing the configuration of a rectifying circuit for high-frequency power supply according to Embodiment 1 of the present invention.
Figure 2:
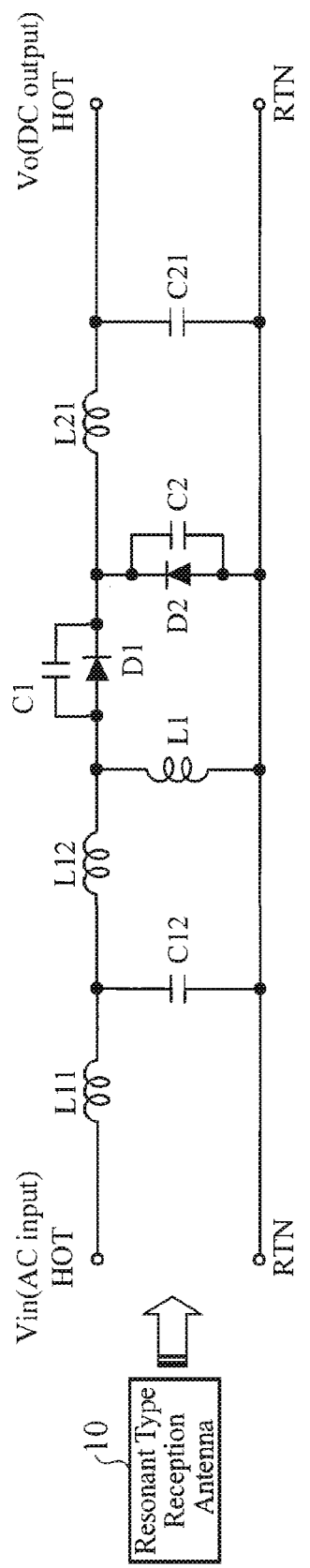
FIG. 2 is a diagram showing another example of the configuration of the rectifying circuit for high-frequency power supply according to Embodiment 1 of the present invention.
Figure 3:
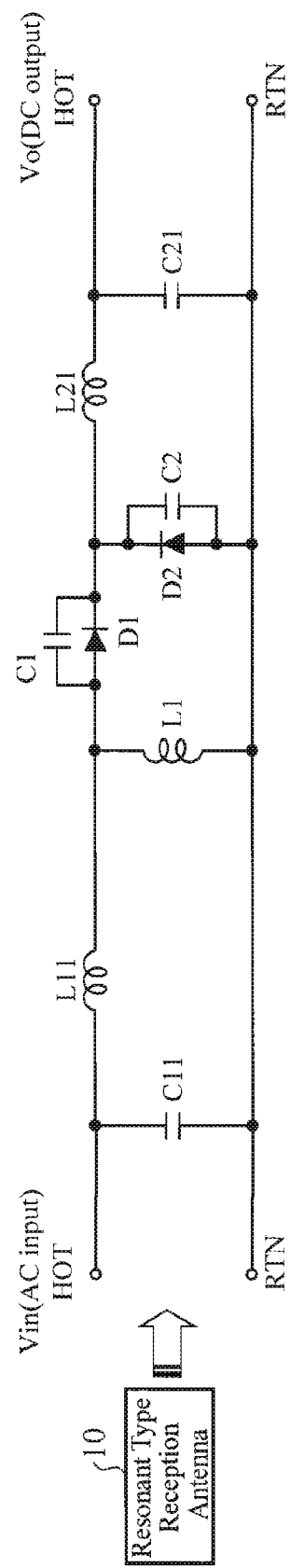
FIG. 3 is a diagram showing another example of the configuration of the rectifying circuit for high-frequency power supply according to Embodiment 1 of the present invention.
Figure 4:
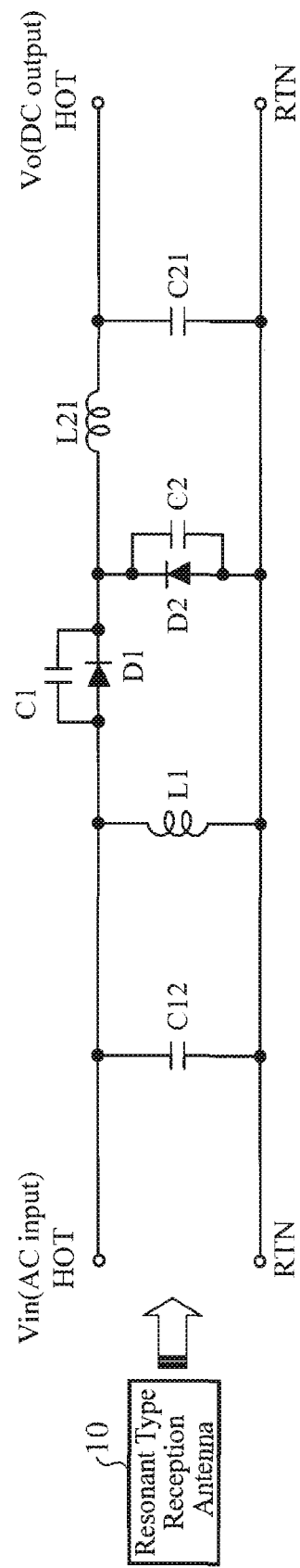
FIG. 4 is a diagram showing another example of the configuration of the rectifying circuit for high-frequency power supply according to Embodiment 1 of the present invention.
Figure 5:
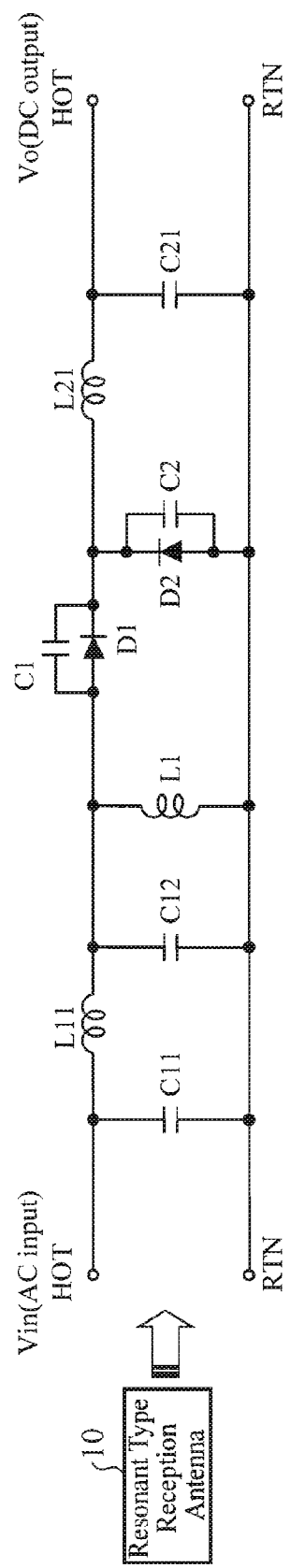
FIG. 5 is a diagram showing another example of the configuration of the rectifying circuit for high-frequency power supply according to Embodiment 1 of the present invention.
Figure 6:
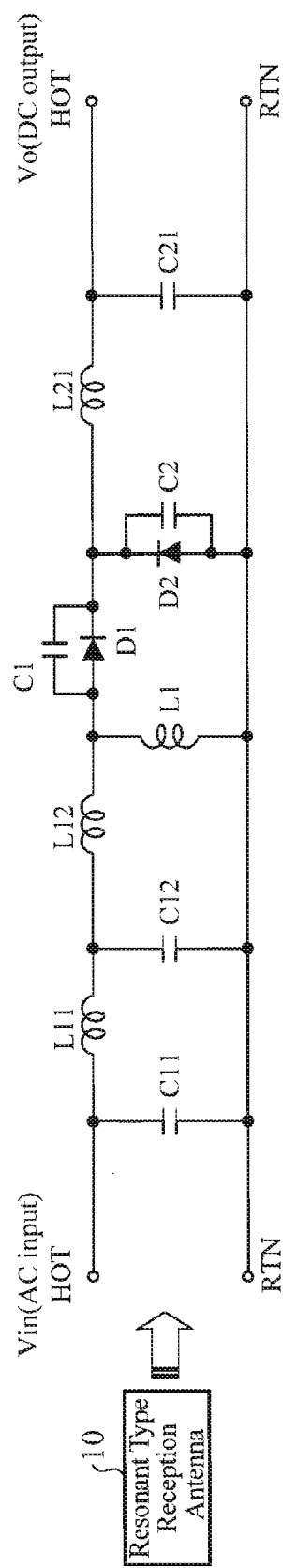
FIG. 6 is a diagram showing another example of the configuration of the rectifying circuit for high-frequency power supply according to Embodiment 1 of the present invention.

FIG. 1 is a diagram showing the configuration of a rectifying circuit for hi frequency power supply according to Embodiment 1 of the present invention.

The rectifying circuit for high-frequency power supply rectifies an alternating voltage Vin at a high frequency equal to or higher than 2 MHz. This rectifying circuit for high-frequency power supply is configured with diodes D1 and D2, capacitors C1, C2 and C12, inductors L1 and L21, a capacitor C21 and an inductor L11, as shown in FIG. 1.

A resonant type reception antenna is reception antenna for power transmission) 10 is a resonant type antenna for power transmission having LC resonance characteristics (which is not limited only to a noncontact type one). This resonant type reception antenna 10 can be of any of magnetic-field resonance type, electric-field resonance type, and electromagnetic induction type.

The diodes D1 and D2 are a rectifying element that constructs a current doubler rectifier circuit for converting the alternating voltage Vin at a hi frequency equal to or higher than 2 MHz, which is inputted from the resonant type reception antenna 10, into a direct voltage. As these diodes D1 and D2, not only diodes for high frequency (RF; Radio Frequency) but also elements, such as diodes of, for example, Si type, SiC type or GaN type, or Schottky barrier diodes, can be used.

The capacitors C1, C2 and C12 and the inductors L1 and L21 construct a partial resonant circuit for a rectifying operation in the diodes D1 and D2 by using a compound function. This partial resonant circuit causes the diodes D1 and D2 to perform partial resonant switching in a switching operation at the time of rectification. The capacitors C1 and C2 are constants that consist of either the parasitic capacitances of the diodes D1 and D2 or combined capacitances of the parasitic capacitances and the capacitances of discrete elements. Further, as the capacitor C12, a ceramic capacitor, a tantalum capacitor, a film capacitor or the like can be used. Further, as the inductors L1 and L21, air-core coils, magnetic material coils or the likes can be used.

The capacitor C21 is an element that constructs a smoothing functional circuit for smoothing a ripple voltage after being rectified by the diodes D1 and D2 into a direct voltage. As this capacitor C21, an element, such as a ceramic capacitor, a tantalum capacitor or a film capacitor, can be used.

The inductor L11 and the capacitor C12 are elements which construct a matching functional circuit having a function of performing impedance matching with the resonant type reception antenna 10 on an input side (matching the resonance condition to that of the resonant type reception antenna 10), and a function of performing impedance matching with the partial resonant circuit configured with the capacitors C1, C2 and C12 and the inductors L1 and L21 (matching the resonance condition to that of the partial resonant circuit). As this inductor L11, an air-core coil, a magnetic material coil or the like can be used. By virtue of this inductor L11 and the capacitor C12, a partial resonant switching operation can be implemented at the time of rectification by the diodes D1 and D2.

The rectifying circuit for high-frequency power supply according to the present invention is configured in this way so as to include the three functions (the matching function, the current doubler rectifying function and the smoothing function) in the single circuit configuration which is not established by using a circuit designing method of keeping those functions separated. The rectifying circuit for high-frequency power supply has a function of performing matching with the output impedance of the resonant type reception antenna 10 and also performing matching with the impedance of the partial resonant circuit configured with the capacitors C1, C2 and C12, and the inductors L1 and L21 by using a compound function according to the inductor L11 and the capacitor C12, and also has a function of performing the diodes D1 and D2 to perform the partial resonant switching in the switching operation at the time of rectification by using the partial resonant circuit. As a result, the switching loss of the diodes D1 and D2 is reduced.

Next, the operation of the rectifying circuit for high-frequency power supply configured as above will be explained.

First, when the alternating voltage Vin having a high frequency equal to or higher than 2 MHz is inputted from the resonant type reception antenna 10, matching with the output impedance of the resonant type reception antenna 10 and impedance matching with the partial resonant circuit configured with the capacitors C1, C2 and C12, and the inductors L1 and L21 are achieved by the compound function according to the inductor L11 and the capacitor C12. Then, while the matching state is maintained, the inputted alternating voltage Vin is rectified into a ripple voltage having a one-sided electric potential (a positive electric potential) by the diodes D1 and D2. At that time, the switching operation by the diodes D1 and D2 becomes partial resonant switching operation by virtue of the compound function according to the capacitors C1, C2 and C12, and the inductors L1 and L21, and enters a ZVS (zero voltage switching) state. This state corresponds to a rectifying operation having the lowest switching loss. Then, the ripple voltage after being rectified is smoothed into a direct voltage by the capacitor C21, and the direct voltage is outputted.

Through the above-mentioned series of operations, the rectifying circuit for high-frequency power supply can rectify the inputted alternating voltage Vin having a high frequency into a direct voltage with high power conversion efficiency (equal to or greater than 90%), and output the direct voltage.

As mentioned above, because the rectifying circuit for high-frequency power supply according to this Embodiment 1 is configured in such a way as to include the function of performing impedance matching with a circuit having a high frequency characteristic in its output impedance, such as the resonant type reception antenna 10, and the function of operating as a part of the partial resonance operation of the current doubler rectifier circuit thereof, the loss at the time of the rectifying operation at a high frequency equal to or higher than a MHz band can be greatly reduced, and high power conversion efficiency (efficiency of 90% or more) can be achieved.

Further, because the power loss in the circuit which occurs at the time of the rectifying operation is small, and hence the heat energy generated is also small and the temperature rise of the circuit board is suppressed to a low value, the influence of the operating environment temperature on the life of the used parts can be reduced. Therefore, a measure, such as a measure of providing a conventional exhaust heat device, is not needed, and a cost reduction, downsizing, a weight reduction and low power consumption can be achieved.

The case in which the rectifying circuit for high-frequency power supply is configured using the diodes D1 and D2, the capacitors C1, C2 and 012, the inductors L1 and L21, the capacitor C21 and the inductor L11 is shown in FIG. 1. However, this embodiment is not limited to this example. For example, the rectifying circuit for high-frequency power supply can have a configuration as shown in any one of FIGS. 2 to 6. In this case, the rectifying circuit for high-frequency power supply can have a configuration which is an optimal one selected from among the configurations shown in FIGS. 1 to 6 according to both the configuration the output impedance) of the resonant type reception antenna 10, and the input impedance of a device which is connected to the output (DC output) of the rectifying circuit for high-frequency power supply.

Figure 7:
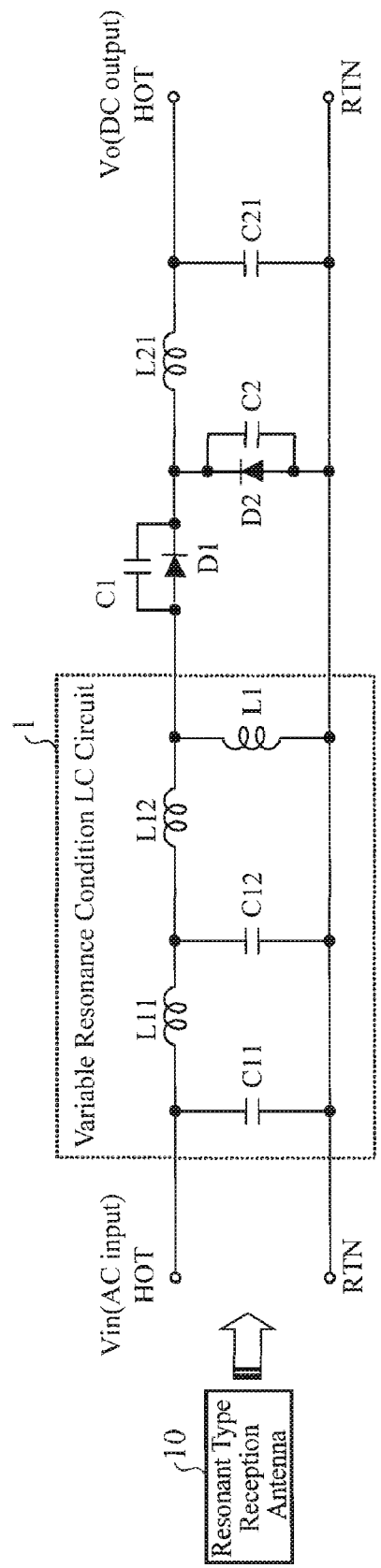
FIG. 7 is a diagram showing another example of the configuration of the rectifying circuit for high-frequency power supply according to Embodiment 1 of the present invention (in a case in which variable resonance condition LC circuits are disposed)

Further, although the explanation is made as to the example shown in FIG. 1 by assuming that the constants of the inductor L11 and the capacitor C12 which construct the matching functional circuit are fixed and the resonance condition is fixed, this embodiment is not limited to this example. A variable resonance condition LC circuit 1 that causes the resonance condition to be variable can be used, as shown in, for example, FIG. 7. FIG. 7 shows an example in which the variable resonance condition LC circuit 1 is applied to the configuration shown in FIG. 6 and having the largest parts count among the configurations shown in FIGS. 1 to 6, and the variable range of the resonance condition is the widest. In the example of FIG. 7, the variable resonance condition LC circuit 1 causes the constants of the inductors L1, L11 and L12 and the capacitors C11 and C12 to be variable.

The variable resonance condition LC circuit 1 can be applied similarly to the examples shown in FIGS. 1 to 5.

Embodiment 2

Figure 8:
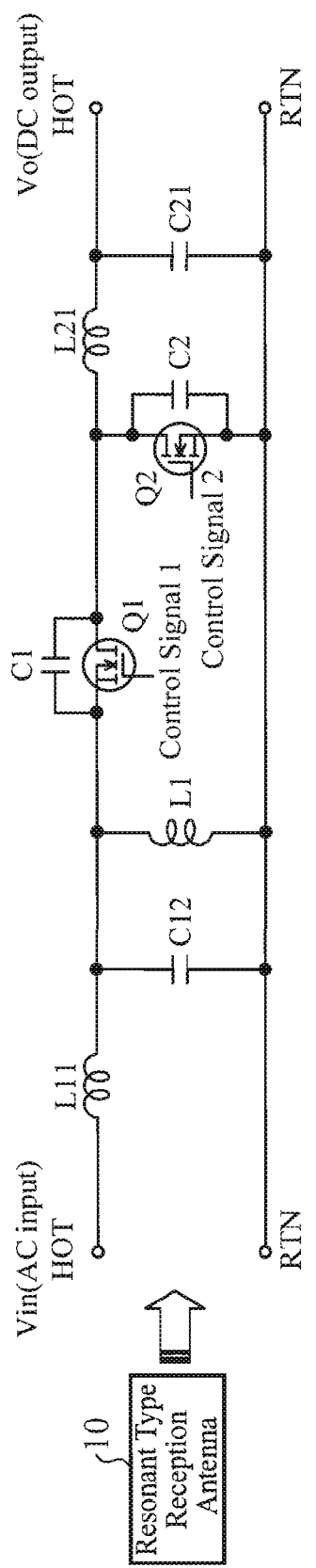
FIG. 8 is a diagram showing example of the configuration of a rectifying circuit for high-frequency power supply according to Embodiment 2 of the present invention (in a case in which FETs are used instead of diodes)

FIG. 8 is a diagram showing the configuration of a rectifying circuit for high-frequency power supply according to Embodiment 2 of the present invention. The rectifying circuit for high-frequency power supply according to Embodiment 2 shown in FIG. 8 is the one in which the diodes D1 and D2 of the rectifying circuit for high-frequency power supply according to Embodiment 1 shown in FIG. 1 are replaced by power semiconductor elements Q1 and Q2. The other components are the same as those according to Embodiment 1 and are designated by the same reference character strings, and an explanation will be made as to only a different portion.

The power semiconductor elements Q1 and Q2 are a rectifying element that constructs a current doubler rectifier circuit for converting an alternating voltage Vin at a high frequency equal to or higher than 2 MHz, which is inputted from a resonant type reception antenna 10, into a direct voltage. As these power semiconductor elements Q1 and Q2, not only field effect transistors for RF (FETs) but also elements, such as Si-MOSFETs, SiC-MOSFETs or GaN-FETs, can be used. Capacitors C1 and C2 consist of either the parasitic capacitances of the power semiconductor elements Q1 and Q2 or combined capacitances of the parasitic capacitances and the capacitances of discrete elements.

Even in the case in which the rectifying circuit for high-frequency power supply is configured using the power semiconductor elements Q1 and Q2 in this way, instead of using the diodes D1 and D2, the same advantages as those provided by Embodiment 1 can be provided.

The configuration in which the diodes D1 and D2 shown in FIG. 1 are replaced by the power semiconductor elements Q1 and Q2 is shown in FIG. 8. However, this embodiment is not limited to this example. For example, the rectifying circuit for high-frequency power supply can have a configuration in which the diodes D1 and D2 shown in any one of FIGS. 2 to 6 are replaced by the power semiconductor elements Q1 and Q2. In this case, the rectifying circuit for high-frequency power supply can have a configuration which is an optimal one selected from among configurations in which the diodes D1 and D2 shown in FIGS. 1 to 6 are replaced by the power semiconductor elements Q1 and Q2, according to both the configuration (the output impedance) of the resonant type reception antenna 10, and the input impedance of a device which is connected to the output (DC output) of the rectifying circuit for high-frequency power supply.

Further, although the explanation is made as to the example shown in FIG. 8 by assuming that the constants of the inductor L11 and the capacitor C12 which construct the matching functional circuit is fixed and the resonance condition is fixed, this embodiment is not limited to this example. A variable resonance condition LC circuit 1 that causes the resonance condition to be variable can be used. Further, also in the configuration in which the diodes D1 and D2 shown in any one of FIGS. 2 to 6 are replaced by the power semiconductor elements Q1 and Q2, a variable resonance condition LC circuit 1 can be similarly applied.

Figure 9:
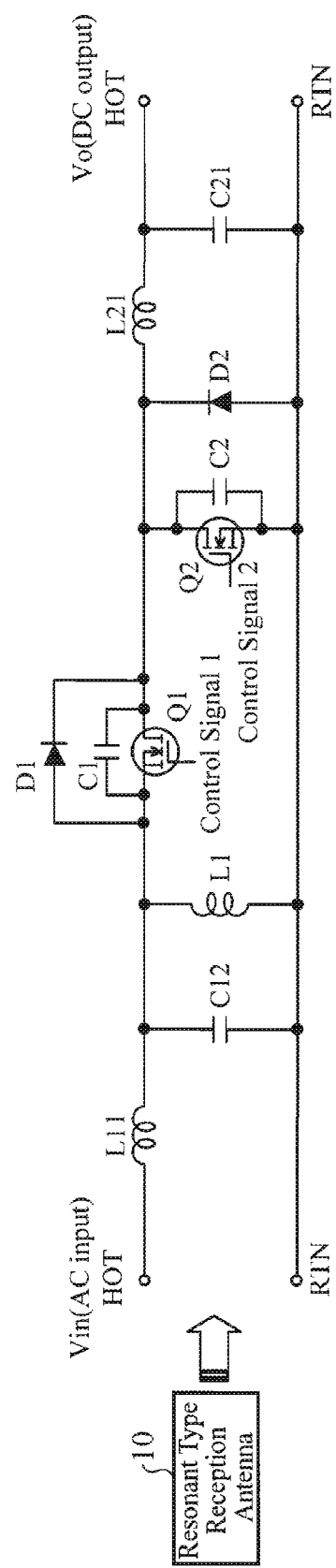
FIG. 9 is a diagram showing another example of the configuration of the rectifying circuit for hi n-frequency power supply according to Embodiment 2 of the present invention (in a case in which diodes and FETs are used)
Figure 10:
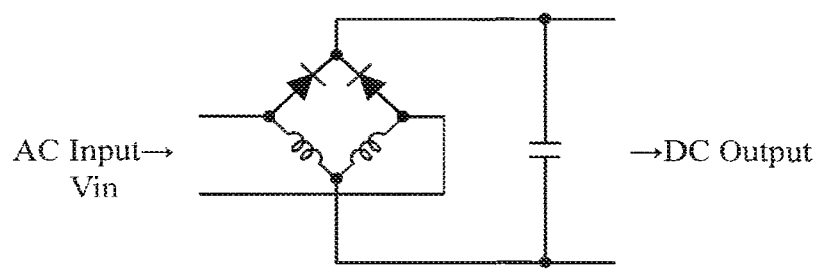
FIG. 10 is a diagram showing the configuration of a conventional rectifying circuit for high-frequency power supply.

Further, the case in which the diodes D1 and D2 are used as the rectifying element is shown in Embodiment 1 while the case in which the power semiconductor elements Q1 and Q2 are used as the rectifying element is shown in Embodiment 2. In contrast with this, both the diodes D1 and D2 and the power semiconductor elements Q1 and Q2 can be used as the rectifying element, as shown in FIG. 9. Although FIG. 9 shows the case in which the rectifying element shown in FIG. 1 is replaced by the rectifying element in which the diodes D1 and D2 and the power semiconductor elements Q1 and Q2 are used, this embodiment is not limited to this example. For example, the rectifying element shown in any one of FIGS. 2 to 6 can be replaced by the rectifying element in which the diodes D1 and D2 and the power semiconductor elements Q1 and Q2 are used. In addition, a variable resonance condition LC circuit 1 can be applied to any one of these configurations.

In addition, while the invention has been described in its preferred embodiments, it is to be understood that an arbitrary combination of two or more of the embodiments can be made, various changes can be made in an arbitrary component according to any one of the embodiments, and an arbitrary component according to any one of the embodiments can be omitted within the scope of the invention.

INDUSTRIAL APPLICABILITY

The rectifying circuit for high-frequency power supply according to the present invention can provide a high power conversion efficiency characteristic in the rectification of an alternating voltage at a high frequency equal to or higher than 2 MHz, and is suitable for use as a rectifying circuit for high-frequency power supply or the like that rectifies an alternating current power supply at a high frequency.

EXPLANATIONS OF REFERENCE NUMERALS 1 variable resonance condition LC circuit, and 10 resonant type reception antenna (reception antenna for power transmission).

The invention claimed is:
1. A rectifying circuit for high-frequency power supply comprising:
a pair of input terminals connected to a reception antenna for power transmission;

a first inductor whose one terminal is connected to a terminal, to which an alternating voltage at a high frequency equal to or higher than 2 MHz is inputted from the reception antenna for power transmission, the terminal being one of the pair of input terminals;

a first capacitor whose one end is connected to an other end of the first inductor and whose other end is connected to the other of the pair of input terminals;

a second inductor whose one end is connected to the other end of the first inductor and whose other end is connected to the other of the pair of input terminals;

a first rectifying element, having first parasitic capacitance, whose one end is connected to one end of the second inductor;

a second rectifying element, having second parasitic capacitance, whose one end is connected to the other of the pair of input terminals and whose other end is connected to an other end of the first rectifying element;

a third inductor whose one end is connected to the other end of the first rectifying element; and a second capacitor whose one end is connected to an other end of the third inductor and whose other end is connected to the other of the pair of input terminals, wherein the second and third inductors, the first and second parasitic capacitances, and the first capacitor cause the first and second rectifying elements to perform partial resonant switching in a switching operation at a time of rectification of the first and second rectifying elements.

2. The rectifying circuit for high-frequency power supply according to claim 1, wherein said first and second rectifying elements are configured using diodes.

3. The rectifying circuit for high-frequency power supply according to claim 2, wherein said diodes are ones other than diodes for high frequency.

4. The rectifying circuit for high-frequency power supply according to claim 1, wherein said first and second rectifying elements are configured using field effect transistors.

5. The rectifying circuit for high-frequency power supply according to claim 1, wherein said first and second rectifying elements are configured using diodes and field effect transistors.

6. The rectifying circuit for high-frequency power supply according to claim 1, wherein said first inductor and said first capacitor match a resonance condition to that of said reception antenna for power transmission according to magnetic-field resonance.

7. The rectifying circuit for high-frequency power supply according to claim 1, wherein said first inductor and said first capacitor match a resonance condition to that of said reception antenna for power transmission according to electric-field resonance.

8. The rectifying circuit for high-frequency power supply according to claim 1, wherein first inductor and said first capacitor match a resonance condition to that of said reception antenna for power transmission according to electromagnetic induction.

9. The rectifying circuit for high-frequency power supply according to claim 1, wherein said first inductor and said first capacitor have a variable resonance condition.

* * * * *